Figure 4:
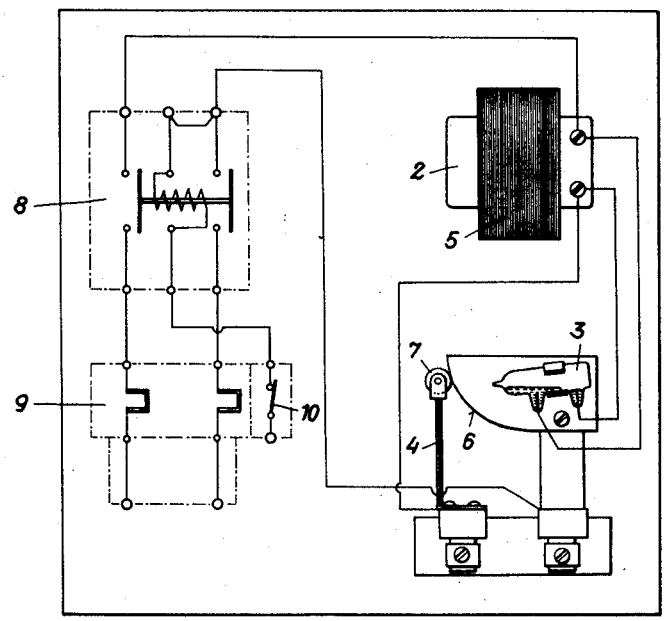

June 21, 1960
E. SCHRACK
2,942,168
AUTOMATIC SHUNTING SWITCH FOR AN INDUCTANCE-TYPE
STARTING CURRENT LIMITING DEVICE FOR
ALTERNATING CURRENT MOTORS
Filed Feb. 21, 1958
2 Sheets-Sheet 1
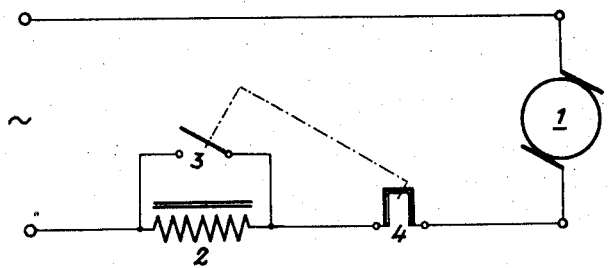
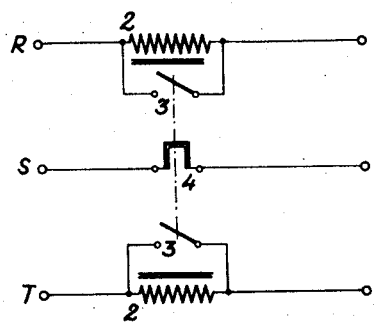
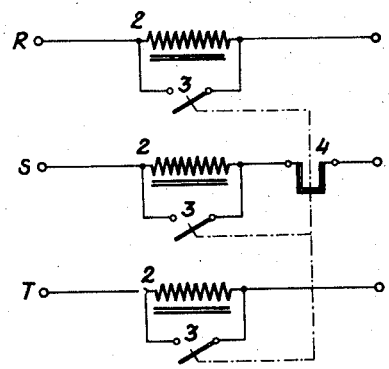
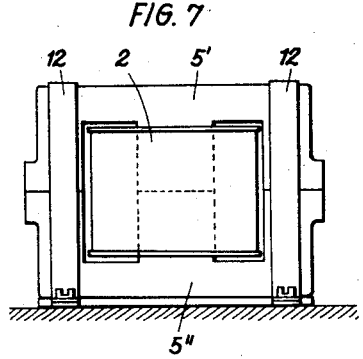
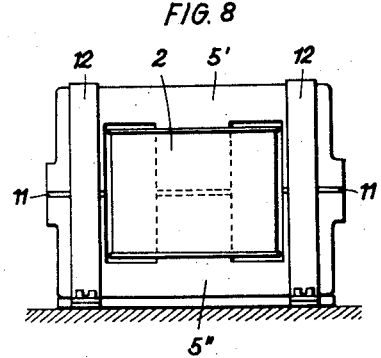
INVENTOR
EDUARD SCHRACK
BY Otto John Munz
ATTY.

June 21, 1960  E. SCHRACK  2,942,168
AUTOMATIC SHUNTING SWITCH FOR AN INDUCTANCE-TYPE
STARTING CURRENT LIMITING DEVICE FOR
ALTERNATING CURRENT MOTORS
Filed Feb. 21, 1958  2 Sheets-Sheet 2

INVENTOR
EDVARD SCHRACK
BY Otto John Munz
ATTY.

United States Patent Office 2,942,168
Patented June 21, 1960

2,942,168

AUTOMATIC SHUNTING SWITCH FOR AN INDUCTANCE-TYPE STARTING CURRENT LIMITING DEVICE FOR ALTERNATING CURRENT MOTORS

Eduard Schrack, 8, Schmerlingplatz, Vienna, Austria

Filed Feb. 21, 1958, Ser. No. 716,745

Claims priority, application Austria May 17, 1957

5 Claims. (Cl. 318—229)

This invention relates to inductance-type starting current limiting devices for single-phase and three-phase alternating current motors, which devices comprise a current-limiting choke which can be automatically bypassed with a time delay. The invention provides a device which distinguishes by very simple construction, high reliability of operation, long useful life and freedom of maintenance.

It is known that alternating current motors which are used, e.g., in refrigerators, air conditioning systems and the like have a very high starting current, the peak of which may rise in extreme cases to 12 to 16 times the rated current and will cause considerable disturbances of other electrical appliances such as lighting, radio, television etc. as a result of the short-time failure of the supply which is inevitable even with wiring systems installed in accordance with the regulations.

For this reason impedances are connected in series with the alternating current motors for reducing the starting current of the motor to a tolerable value of 5 to 6 times the rated current. These impedances are rendered inoperative by an automatic time-limit switch a short time after they have been inserted into the circuit. Because the impedance of the motor is highly inductive during the starting period, inductance-type starting current limiting devices, in which the impedance has approximately the same vectorial position, have proved much more effective than series resistors of approximately the same value.

In the previously known inductance-type starting current limiting devices, so-called "stator starters," for alternating current motors the choke is bypassed by a contactor, which is operated by a mechanical timer or an electrical time-limit relay. The devices are very complicated and expensive. Requiring regular attendance, they are not unconditionally reliable in operation.

According to this invention the current limiting choke of inductance-type starting current limiting devices for alternating current motors, which choke can be automatically bypassed with a time delay, is arranged to be bypassed by a mercury switch tube and a bimetal strip is provided which is deflected shortly after the closing of the circuit first by the starting current and then by the rated current and the deflection of which closes the mercury switch tube to bypass the choke during the operation of the motor.

In connection with three-phase A.C. motor, each of at least two of the three phase conductors includes according to the invention a current limiting choke with a bypassing mercury switch whereas a bimetal strip included in one phase is arranged for the joint operation of all two or three switch tubes. If only two chokes are provided, the bimetal strip is preferably included in the free phase conductor.

The application of the starting current limiting devices according to the invention is based on the fact that the motors of refrigerating and air conditioning systems have only about four to ten start-and-stop cycles per hour, with long intervals between said cycles, so that the automatic switchgear which limits the time for which the starting current is choked does not need to be ready for use immediately after it has operated. This purpose is perfectly sufficiently served by the mercury switch tubes which are used according to the invention although they are not capable of switching at a very high rate. Because the switch tube employed bypasses only part of the nominal voltage as it is closed, the closing operation does not place an appreciable load on the switch tube if the same is economically designed so that the current lies at the upper limit of its making capacity. Because the slow bending back of the bimetal strip will cause the mercury switch to be opened a few seconds after the motor has been deenergized, the switch tube is not placed under an inductive load when the motor is being switched off.

In a preferred embodiment of the starting current limiting device according to the invention the mercury switch tube is affixed to a pivoted cam, the underside of which is engaged by a loose roller which is rotatably carried by the upper end of the preferably U-shaped bimetal strip. The deflection of the bimetal strip causes the loose roller to lift the cam so as to move the mercury switch tube to its circuit closing position.

According to another feature of the invention the current limiting choke is constructed as an iron-cored choke between symmetrical E-shaped core halves, which may either be forced against each other without air gap or may be spaced by a non-magnetic barrier to reduce the inductance if the supply line includes another impedance which is effective to limit the starting current.

Figure 6:
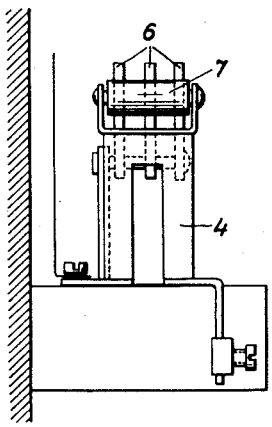
Figure 5:
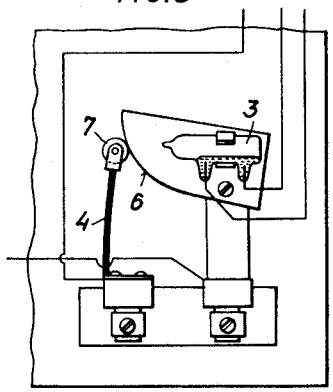

Several illustrative embodiments of the starting current limiting device according to the invention are shown in the drawing, in which Fig. 1 shows the wiring diagram of the device for single-phase connection and Figs. 2 and 3 show two variants for three-phase application. Fig. 4 shows a practical construction of a control unit, combined in an assembly with the associated motor starter. Fig. 5 is an enlarged view showing the actual switching member consisting of a mercury switch tube together in the tilted position with a cam and bimetal strip. Fig. 6 shows the same part in the construction for three-phase A.C. motors, viewed in the direction of the cams. Finally, Figs. 7 and 8 show two forms of the iron-cored current-limiting choke.

Fig. 1 illustrates the basic principle of the inductance-type starting current limiting device according to the invention. The current-limiting choke 2, with its bypassing switch 3, which consists of a mercury switch tube, and the bimetal strip 4 are connected in series to the supply line leading to the single-phase A.C. motor 1. Figs. 2 and 3 show two variants of the circuit of the starting current limiting device for use in a three-phase A.C. system. In the first case two phase conductors, R and T, include a current-limiting choke 2 and a bypassing switch 3 whereas the third conductor S includes the bimetal strip 4, which serves in this case for operating both switch tubes 3. In the basically similar system of Fig. 3 the current-limiting chokes 2 are included in all three phase conductors and have bypassing switches 3 which are jointly operated by the bimetal strip 4 included only in one conductor. This provides for a balance of the three-phase system.

Fig. 4 shows a practical construction of the starting current limiting device, in which the current limiting choke 2 consists of an iron-cored coil provided with the laminated iron core 5. The slightly inclined mercury switch tube 3 is secured to a pivoted upright cam 6, so that its contacts are opened in its position of rest, when the motor is switched off. The bimetal strip 4, which is suitably U-shaped as shown in Fig. 6, carries at its top a bracket with a loose roller 7, which just contacts the cam when the bimetal strip is upright in the cold condition. It is also apparent from Fig. 4 that the starting current limiting device may be mounted on a common base plate with the associated controlgear for the motor, which consists f.i. of an air-break contactor 8 and an additional bimetal relay 9 for overload protection (contactor coil interruptor 10).

Fig. 5 illustrates the mode of operation of the starting current limiting device according to the invention. This mode of operation will be understood without difficulty. The starting current, which is limited by the current-limiting choke 2, e.g., to five to six times the rated motor current, heats the bimetal strip 4 so quickly that its deflection causes the cam 6 to be turned by the roll 7 within a few seconds sufficiently to tilt the mercury switch tube whereby the current-limiting choke 2 is bypassed. The bimetal strip 4 may be dimensioned without difficulty so that its first deflection, which corresponds to the limited starting current, is much stronger than would be necessary to hold the tilted switch tube in its contact-closing position, whereas on the other hand the bimetal strip will be sufficiently deflected for holding the tilted, bypass mercury tube also when the motor current has subsequently dropped to its rated running current.

If the motor is switched off by one of the usual automatic circuit-braking operations, e.g., by an overload relay controlling the coil circuit of a contactor, the bimetal strip 4 will cool within a few seconds and by bending back will release the cam 6 sufficiently for opening the contacts of the tilting switch 3. As a result, the starting current limiting device is ready for the next motor starting, the current-limiting choke 2 being effectively connected in the circuit. This restoring period of a few seconds is entirely sufficient for motor starting cycles of less than 6 starts per hour as it is usual for instance, with air conditioning or refrigerating equipment.

Figs. 7 and 8 illustrate a suitable construction of the current-limiting choke 2. The iron core 5 of this choke consists of two symmetrical E-shaped halves 5' and 5", the abutting end faces of which have been properly ground to avoid an undue air gap between them. These two core halves may either be forced tightly against each other, with a negligible air gap, as is shown in Fig. 7, or they may be spaced apart by a barrier 11 of nonmagnetic material, whereby the inductance of the coil may be reduced, if desired, as is shown in Fig. 8. This may be useful in some installations, in which the impedance of the motor feeder line provides part of the necessary limitation of the starting current. In both cases the two laminated core halves 5' and 5" are forced together by U-shaped clamps 12.

What I claim is:

1. An automatic shunting switch for an inductance-type starting current limiting device for alternating current motors, which device comprises at least one conductive path adapted to be connected in series with one phase of said motor, at least one of said paths including a current limiting choke, said switch comprising a mercury switch tube adapted to be associated with said choke and operable to bypass said choke when associated therewith, and a bimetal strip adapted to be included in one of said paths and to deflect when flown through by current and operatively connected to said mercury switch tube to operate the same sufficiently to bypass said choke associated therewith when said bimetal strip has undergone a predetermined deflection after a period of current flow therethrough.

2. An automatic shunting switch as set forth in claim 1, which comprises a pivoted cam carrying said mercury switch tube and a loose roller carried by the upper end of said bimetal strip and engaging the underside of said cam, said cam being adapted to be lifted by said roller into a position in which said mercury switch tube bypasses the choke associated therewith responsive to a sufficient deflection of said bimetal strip.

3. An automatic shunting switch as set forth in claim 2, in which said bimetal strip has the shape of a U having two upwardly extending limbs, the upper ends of which carry said loose roller between them.

4. An automatic shunting switch for an inductance-type current limiting device for three-phase alternating current motors, which device comprises three conductive paths, each of which is adapted to be connected in series with one phase of said motor, at least two of said paths including a current limiting choke, said switch comprising at least two mercury switch tubes each of which is adapted to be associated with one of said chokes and operable to bypass said choke with which it is associated, and a bimetal strip adapted to be included in one of said paths and arranged to deflect when flown through by current and operatively connected to all said mercury switch tubes to operate the same sufficiently to bypass the chokes associated therewith when said bimetal strip has undergone a predetermined deflection after a period of current flow therethrough.

5. An automatic shunting switch for an inductance-type starting current limiting device for an alternating current motor having a predetermined current rating and predetermined starting current characteristics, which device comprises at least one conductive path adapted to be connected in series with one phase of said motor, at least one of said paths including a current limiting choke, said switch comprising a mercury switch tube adapted to be associated with said choke and operable to bypass said choke when associated therewith, and a bimetal strip adapted to be included in one of said paths and to deflect when flown through by current and operatively connected to said mercury switch tube to operate the same sufficiently to bypass said choke associated therewith when said bimetal strip has been flown through for a period of time by the starting current of said motor, as limited by said choke, and to maintain said mercury switch tube in a condition in which it bypasses the choke associated therewith while said bimetal strip is flown through by the rated current of said motor.

References Cited in the file of this patent

FOREIGN PATENTS

| | | |
|---|---|---|
| 462,043 | Great Britain | May 23, 1935 |
| 832,771 | France | July 4, 1938 |